(12) United States Patent
Turner et al.

(10) Patent No.: US 7,879,267 B2
(45) Date of Patent: Feb. 1, 2011

(54) METHOD FOR COATING ARTICLES BY MOLD TRANSFER

(75) Inventors: David C. Turner, Jacksonville, FL (US); Lenora C. Copper, Jacksonville, FL (US); Dominic Gourd, Jacksonville, FL (US); Shivkumar Mahadevan, Starke, FL (US); Frank F. Molock, Orange Park, FL (US); Kevin P. McCabe, Jacksonville, FL (US); Dharmesh K. Dubey, Jacksonville, FL (US); Jeffery S. Longo, Jacksonville, FL (US); Jonathan P. Adams, Jacksonville, FL (US); Andrew J Wagner, Jacksonville, FL (US); Xiaoping Lin, Jacksonville, FL (US)

(73) Assignee: J&J Vision Care, Inc., Jacksonville, FL (US)

( * ) Notice: Subject to any disclaimer, the term of this patent is extended or adjusted under 35 U.S.C. 154(b) by 418 days.

(21) Appl. No.: 09/921,192

(22) Filed: Aug. 2, 2001

(65) Prior Publication Data

US 2003/0052424 A1    Mar. 20, 2003

(51) Int. Cl.
*B29D 11/00*    (2006.01)
*B29C 35/08*    (2006.01)

(52) U.S. Cl. ............... 264/1.7; 264/1.32; 264/1.36; 264/1.38; 264/2.1; 264/236; 264/250; 264/255; 264/299; 264/310; 264/338; 264/494; 264/496

(58) Field of Classification Search ............ None
See application file for complete search history.

(56) References Cited

U.S. PATENT DOCUMENTS

| | | | |
|---|---|---|---|
| 3,764,502 A | 10/1973 | Restaino | |
| 3,808,178 A | 4/1974 | Gaylord | |
| 3,912,607 A | 10/1975 | Communal | |
| 3,916,033 A | 10/1975 | Merrill | |
| 3,926,756 A | 12/1975 | Restaino | |
| 3,948,740 A | 4/1976 | Phalangas | |
| 3,968,305 A | 7/1976 | Oshima et al. | |
| 4,066,522 A | 1/1978 | Machi | |
| 4,099,859 A | 7/1978 | Merrill | |
| 4,115,339 A | 9/1978 | Restaino | |
| 4,120,570 A | 10/1978 | Gaylord | |
| 4,136,250 A | 1/1979 | Mueller | |
| 4,153,641 A | 5/1979 | Deichert | |
| 4,178,221 A | 12/1979 | Boutin | |
| 4,190,277 A | 2/1980 | England | |
| 4,294,676 A | 10/1981 | Boutin | |
| 4,325,794 A | 4/1982 | Hunter | |
| 4,440,918 A | 4/1984 | Rice et al. | |
| 4,529,782 A | 7/1985 | Fan | |
| 4,544,572 A | 10/1985 | Sandvig et al. | |
| 4,569,962 A | 2/1986 | Burguette et al. | |
| 4,581,430 A | 4/1986 | Phan | |
| 4,612,336 A | 9/1986 | Yada et al. | |
| 4,640,805 A | 2/1987 | Neefe | |
| 4,740,533 A | 4/1988 | Su | |
| 4,746,690 A | 5/1988 | Busch | |
| 4,800,123 A | 1/1989 | Boeckeler | |
| 4,863,647 A | 9/1989 | Baylor, Jr. | |
| 4,874,827 A | 10/1989 | Kanluen | |
| 4,895,102 A * | 1/1990 | Kachel et al. | 118/620 |
| 4,963,159 A * | 10/1990 | Narducy et al. | 8/507 |
| 5,010,155 A | 4/1991 | Mueller | |
| 5,034,461 A | 7/1991 | Lai | |
| 5,070,215 A | 12/1991 | Bambury | |
| 5,185,385 A | 2/1993 | Kanluen | |
| 5,316,700 A * | 5/1994 | Soye et al. | 264/1.1 |
| 5,397,848 A * | 3/1995 | Yang et al. | 525/477 |
| 5,667,735 A | 9/1997 | Bae et al. | |
| 5,760,100 A * | 6/1998 | Nicolson et al. | 523/106 |
| 5,779,943 A * | 7/1998 | Enns et al. | 264/1.7 |
| 5,849,692 A | 12/1998 | Joncczyk et al. | |
| 5,938,795 A | 8/1999 | Molock | |
| 5,945,465 A * | 8/1999 | Ozark et al. | 523/106 |
| 6,039,899 A * | 3/2000 | Martin et al. | 264/1.36 |
| 6,087,415 A * | 7/2000 | Vanderlaan et al. | 523/105 |
| 6,099,852 A * | 8/2000 | Jen | 424/429 |
| 6,162,844 A | 12/2000 | Lally et al. | |
| 6,169,127 B1 * | 1/2001 | Lohmann et al. | 523/106 |
| 6,217,171 B1 | 4/2001 | Auten et al. | |
| 6,248,266 B1 * | 6/2001 | Gartley et al. | 264/1.36 |
| 6,478,423 B1 * | 11/2002 | Turner et al. | 351/177 |
| 6,486,262 B1 * | 11/2002 | Suzuki et al. | 525/332.9 |
| 6,551,531 B1 * | 4/2003 | Ford et al. | 264/2.5 |

(Continued)

FOREIGN PATENT DOCUMENTS

EP    80539 B1    5/1986

(Continued)

OTHER PUBLICATIONS

PCT International Search Report, dated Nov. 4, 2002, for PCT Int'l. Appln. No. PCT/US02/24022.

*Primary Examiner*—Jeffrey Wollschlager

(57) ABSTRACT

A method for coating hydrogel and silicone hydrogel articles, and articles made by the method, are provided in which the coating is first applied to the molding surface in which an article-forming material will be cured to form the article. The method permits the thickness and uniformity of the coating to be more easily controlled than in known coating methods.

63 Claims, No Drawings

U.S. PATENT DOCUMENTS

| | | | |
|---|---|---|---|
| 6,565,776 B1 * | 5/2003 | Li et al. | 264/2.5 |
| 6,632,887 B2 * | 10/2003 | LeBoeuf et al. | 525/203 |
| 6,706,836 B1 * | 3/2004 | Holguin et al. | 526/320 |
| 6,719,929 B2 * | 4/2004 | Winterton et al. | 264/1.7 |
| 6,818,018 B1 * | 11/2004 | Sawhney | 623/11.11 |
| 6,832,887 B2 | 12/2004 | Baer | |
| 6,893,595 B1 * | 5/2005 | Muir et al. | 264/255 |
| 7,091,283 B2 * | 8/2006 | Muller et al. | 525/292 |
| 2001/0036556 A1 | 11/2001 | Jen | |

FOREIGN PATENT DOCUMENTS

| | | | |
|---|---|---|---|
| EP | 362137 A2 | | 4/1990 |
| EP | 0362137 A2 | * | 4/1990 |
| EP | 0 396 376 A | | 11/1990 |
| WO | WO 93 09154 A | | 5/1993 |
| WO | WO 94 04345 A | | 3/1994 |
| WO | WO 00/04078 | * | 1/2000 |
| WO | WO 0121375 A1 | | 3/2001 |
| WO | WO0127662 | * | 4/2001 |

* cited by examiner

METHOD FOR COATING ARTICLES BY MOLD TRANSFER

FIELD OF THE INVENTION

This invention relates to coated articles including, without limitation, contact lenses. In particular, the invention relates to coated hydrogel and silicone-hydrogel articles formed by curing a reaction mixture of article-forming material in a mold the molding surface of which has a film of the coating.

BACKGROUND OF THE INVENTION

The use of hydrogels to form articles such as contact lenses is well known. It is further known to increase the oxygen permeability of hydrogels by adding silicone-containing monomers to the hydrogel formulations to produce silicone hydrogels.

Typically, it is desirable to increase the surface wettability of hydrogel and silicone hydrogel articles by coating the articles with a hydrophilic coating. Numerous hydrophilic coatings and methods for their application are known. For example, it is known to apply a coating to a silicone hydrogel lens using gas plasma. This coating method is disadvantageous in that it requires dehydration of the lens prior to application of the plasma treatment, which treatment must be carried out under vacuum conditions.

Alternatively, it is known to use solution- or solvent-based coatings to coat lenses. However, these coating methods, as does the plasma treatment, add steps to the lens manufacturing process and also result in the production of large quantities of waste. Further, application of a solution-based coating uniformly over a lens surface requires extremely precise process control.

Application of a coating onto a mold into which a lens material is dispensed also has been disclosed. However, this method has been successfully demonstrated only with non-silicone hydrogel materials. Therefore a need exists for a coating method for coating hydrogel and silicone hydrogel lenses that overcomes one or more of these disadvantages.

DETAILED DESCRIPTION OF THE INVENTION AND PREFERRED EMBODIMENTS

A method for coating hydrogel and silicone hydrogel articles, and articles made by the method, are provided in which an uncured coating is first applied to the molding surface of a mold in which an article-forming material will be cured to form the article. Thus, the article is coated during the course of curing the material from which it is formed eliminating the need for additional processing steps after curing is completed. Additionally, the method permits the thickness and uniformity of the coating to be more easily controlled than in known coating methods. Finally, because the method does not rely on specific reaction chemistries for attachment of the coating to the lens, as do other known coating methods, any of a wide variety of coatings that cannot be adequately achieved using known coating methods are made possible.

The invention provides a method for coating articles the method comprising, consisting essentially of, and consisting of: a.) coating a molding surface of a mold or a mold half with a coating effective amount of a high molecular weight coating composition; b.) dispensing a mixture comprising a hydrogel monomer, a silicone-containing hydrogel monomer, or a combination thereof into the mold or mold half; and c.) curing under conditions suitable to form an article coated with the coating composition.

The invention may be used to produce any of a wide variety of coated articles. Preferably, the invention is used to produce ophthalmic lenses including, without limitation, contact, intraocular, and onlay lenses. More preferably, the invention is used to produce contact lenses.

For purposes of the invention, by "molding surface" is meant a surface used to form a surface of an article. Typically, molded articles are formed within a mold or between two mold halves. The mold or mold halves used to form an article have an inner surface, the molding surface, and an outer non-molding surface. One ordinarily skilled in the art will recognize that the molding surface will be of the dimensions and surface type requisite for forming the desired molded article.

By "high molecular weight" is meant an average molecular weight ("Mw") sufficiently high so as to avoid dissolution of the coating into the monomer mixture used. For purposes of the invention, preferably the molecular weight is determined using gel permeation chromatography ("GPC") with a light scattering detector and a high sensitivity refractive index detector, for example model PL-RI available from Polymer Labs. The GPC is performed using a phenogel 5 μm linear column equipped with a guard column of the same components and a solution of 0.5 weight percent lithium bromide in dimethyl formamide as the eluent. Flow rates are 0.5 mL per minute with injection volumes from about 10 to about 20 μL. The precise Mw used will depend upon the coating selected and the monomer mixture used. In a preferred embodiment, the Mw of the coating is greater than about 300 kD.

As an alternative, useful coating compositions have a viscosity of a greater than about 1 cP, preferably at least about 4 cP, at 25 degrees centigrade. For purposes of the invention, preferably the viscosity is determined by dissolving the monomer or polymer component in a suitable solvent and measuring the viscosity at a shear rate of 40/s. Preferably used, when the article forming material is a silicone hydrogel is 1.00 weight percent in a 1:1 solvent mixture of ethanol: ethyl lactate or isopropanol:isopropyl lactate.

By "hydrogel monomer" is meant is a material that after curing and hydration is elastomeric and has a water content of about 20 weight percent or more. By "silicone-containing hydrogel monomer" is meant a hydrogel monomer that contains one or more silicone groups.

For purposes of the invention, the term "monomer" refers to compounds having number average molecular weights less than about 700, that can be polymerized, and to medium to high molecular weight compounds or polymers, sometimes referred to as macromonomers or macromers, having number average molecular weights greater than about 700, containing functional groups capable of further polymerization. The term monomer includes monomers, macromonomers, macromers, and prepolymers. Prepolymers are partially polymerized monomers or monomers that are capable of further polymerization.

In preferred embodiment, the invention provides a method for coating hydrogel and silicone-containing hydrogel articles the method comprising, consisting essentially of, and consisting of: a.) coating a molding surface of a mold or a mold half with a coating effective amount of a high molecular weight hydrophilic coating composition; b.) dispensing a mixture comprising a hydrogel monomer, a silicone-containing hydrogel monomer, or a combination thereof into the mold or mold half; and c.) curing under conditions suitable to form an article coated with the coating composition. For purposes of the invention, by "hydrophilic" is meant a material that, when polymerized, exhibits an advancing dynamic contact angle of less than about 100 degrees in physiological saline.

In a more preferred embodiment, the invention is used to produce physiologically compatible contact lenses and, thus, provides a method for coating contact lenses the method comprising, consisting essentially of, and consisting of: a.) coating a molding surface of a mold or a mold half with a coating effective amount of a high molecular weight hydrophilic coating composition; b.) dispensing a mixture comprising a hydrogel monomer, a silicone-containing hydrogel monomer, or a combination thereof into the mold or mold half; and c.) curing under conditions suitable to form a contact lens coated with the coating composition, wherein the lens exhibits physiological compatibility.

By "physiologically compatibility" or "physiological compatible" is meant that the lens exhibits clinical performance, in terms of on-eye wettability and resistance to surface deposits that is equal to or better than that of an etafilcon A lens. On-eye wettability is determined by measuring noninvasive, tear break-up time using a tear scope placed between a slit lamp microscope and a lens wearer's eye. The lens wearer blinks and holds the eye open while the eye is viewed through the slit lamp, typically at a magnification of about 16 to 20×. The time between the blink and the first observed non-wetting of the lens surface is the non-invasive, tear break-up time. The non-invasive tear break-up time for the lenses of the invention are equal to or greater than that of an etafilcon A lens or equal to or greater than about 5 to about 10 secs. Preferably, the lens of the invention exhibit a non-invasive tear break-up time of about 7 to about 10 secs.

Surface deposition resistance is measured for both the front and back lens surfaces by scanning the entire lens on eye using a slit lamp with a magnification of about 16 to about 20× and a beam width and height set at approximately one-half of the corneal diameter, typically a width of approximately 2 mm and a beam height of approximately 6 mm. Deposits may be appear as discrete deposits, such as jelly bumps, or as oily patches or film and will move with the lens during blink or Josephson Push-Up testing. No observable deposition is a grade 0; grade 1 is about 1 to about 5 percent of the lens surface with deposition; grade 2 is about 6 to about 15 percent with deposition; grade 3 is about 16 to about 25 percent deposition and grade 4 is greater than about 26 percent deposition. The surface deposition for the lenses of the invention are equal to or greater than that of an etafilcon A lens meaning that less than about 15% of a clinical population will have Grade 3 or higher deposition after one week of wear.

Coating compositions useful in the invention may contain any of a wide variety of monomers and polymers known in the art. Preferred are poly(vinyl alcohol), polyethylene oxide, poly(2-hydroxyethyl methacrylate), poly(methyl methacrylate), poly(acrylic acid), poly(methacrylic acid), poly(maleic acid), poly(itaconic acid), poly(acrylamide), poly(methacrylamide), poly(dimethylacrylamide), poly(glycerol methacrylate), polystyrene sulfonic acid, polysulfonate polymers, poly(vinyl pyrrolidone), carboxymethylated polymers, such as carboxymethylcellulose, polysaccharides, glucose amino glycans, polylactic acid, polyglycolic acid, block or random copolymers of the aforementioned, and the like, and mixtures thereof. Preferably, poly(2-hydroxyethyl methacrylate), poly(vinyl pyrrolidone), poly(acrylic acid), poly(methacrylic acid), poly(meth)acrylamide, or poly(acrylamide) is used. More preferably, poly(2-hydroxyethyl methacrylate) is used.

The coating composition may, and for spin coating purposes preferably does, include a low boiling point, or less than about 90° C., solvent and a high boiling point, or greater than about 100° C., solvent. Suitable low boiling solvents include, without limitation, n-methyl pyrrolidone, acetone, chloroform, and alcohols such as methanol, ethanol, isopropanol, tert-butanol, and the like. Useful high boiling solvents include, without limitation, methyl-, ethyl-, and isopropyl lactate, ethylene and (poly)ethylene glycol, propylene glycol, n-methyl pyrrolidone, dimethyl formamide, tetrahydrogeraniol, 1-butanol, 1-pentanol, 1-hexanol, 1-octanol, 3-methyl-3-pentanol, dimethyl-3-octanol, 3-methoxy-1-butanol, 1,2 and 1, 4-butanediol, 1,3-hexanediol, water, and the like. Typically, the ratio of the low to the high boiling solvent will be about 1:1 at room temperature.

Additionally, the coating composition may include, and preferably includes, at least one surfactant. Suitable surfactants include, without limitation, anionic surfactants, such as carboxylic acid salts, sulfonic acid salts, sulfuric acid salts, phosphoric and polyphosphoric acid esters, cationic surfactants, such as long chain amines and their salts, diamines and polyamines and their salts, quartemary ammonium salts, amine oxides, nonionic surfactants, such as polyoxyethylenated alkylphenols, alkyl phenol ethoxylates, polyoxyethylenated straight chain alcohols, polyethoxylated polyoxypropylene glycols, polyethoxylated polydimethylsiloxane copolymers, fluorinated alkane ethoxylate copolymers, and long chain carboxylic acid esters, zwitterionic surfactants, such as pH-sensitive and pH insensitive surfactants, and the like, and combinations thereof The specific type and amount of surfactants used will depend upon the other components of the coating composition and the molding surface used. Typically, greater than or equal to about 0.001 weight percent and less than or equal to about 5 weight percent based on the total weight of the coating composition will be used.

In a first step of the method of the invention, a coating effective amount of a suitable coating composition is coated onto the molding surface of a mold or mold half. Preferably, all exterior surfaces of the article are coated and, thus, preferably the entire or substantially the entire molding surfaces of both mold halves are coated. One ordinarily skilled in the art will recognize that one of the mold half's molding surfaces may be coated with a coating different or the same as that used on the other mold half s molding surface.

The thickness of the coating composition, when dry, on the molding surface of the mold must be such that an article with an acceptable surface roughness results. In embodiments in which the article is a contact lens, preferably a peak-to-peak surface roughness of the hydrated lens is less than about 500 nm is desirable. Thus, by coating effective amount is meant an amount of the coating composition sufficient to provide a dry film thickness of the coating composition on the molding surface that will result in a hydrated article with an acceptable surface roughness and for contact lenses preferably a hydrated lens peak-to-peak surface roughness of less than about 500 nm. More preferably, for contact lens embodiments, the amount of coating composition used is an amount sufficient to produce a dry film thickness of at least about 5 nm and no more than about 70 nm, preferably at least about 5 nm and no more than about 50 nm, more preferably at least about 20 nm and no more than about 40 nm.

The coating composition may be applied to the molding surface by any suitable method including, without limitation, compression, swabbing, spray coating, ink jet printing, aerosolization, nebulization, dip coating, spin coating, and the like and combinations thereof Preferably, spin coating is used. Also, preferably, the coating is dried, or rendered non-tacky, prior to introduction of the article forming material into the mold. Drying may be carried out using any suitable method, but preferably is carried out at temperatures up to about the glass transition temperature ("Tg") of the mold material in air or under vacuum followed by equilibration under a blanket of nitrogen at any temperature up to about the Tg of the mold material. During the vacuum exposure process, cold traps or other filters preferably are used to prevent contamination of the mold.

In a spin coating method, the coating composition preferably has a lower surface tension than that of the molding surface's surface energy. More preferably, the surface tension of the coating composition is greater than about 3 dynes/cm below that of the surface energy of the molding surface to which it is applied when measured at the coating application temperature. Most preferably, the surface tension of the coating composition is more than 8 dynes/cm below that of the surface energy of the molding surface.

In a preferred spin coating method for use in forming contact lenses, spin coating is used to deposit a coating of a dry thickness of about 5 to about 70 nm onto a molding surface of a mold. If the surface tension of the coating differs from the surface energy of the mold by greater than about 8 dynes/cm when measured at the coating application temperature, a suitable spin profile is at least about 6,000 and no more than about 8,000 RPM using at least about 2 and no more than about 20 μl of coating composition and spinning for at least about 3 sec. If the surface tension difference is less than about 8 dynes/cm, the mold is spun up to at least about 3,000 and no more than about 5,000 RPM using at least about 2 and no more than about 10 μl of coating composition and then the mold is spun up to at least about 7,000 and more than about 10,000 RPM for at least about 3 seconds prior to stopping.

Any excess coating accumulating at the mold edges must be removed and removal may be carried out by any convenient method including, without limitation, swabbing the excess, removing the excess using vacuum, solvent, washing or pressurized air jet. Preferably, the excess is removed using an air jet. In using the air-jet, it is critical that spinning is started prior to the jet being turned on and, preferably, the air jet pressure is equal to or greater than about 10 psi.

In the second step of the method of the invention, an article-forming material that is a mixture comprising a hydrogel monomer, a silicone-containing hydrogel monomer, or combinations thereof is dispensed into the mold or mold half Useful hydrogel monomers are known and include, without limitation, hydrophilic monomers, preferably acrylic- or vinyl-containing. Hydrogel monomers that may be used include, without limitation, polyoxyethylene polyols having one or more of the terminal hydroxy groups replaced with a functional group containing a polymerizable double bond. Suitable monomers include, without limitation, polyethylene glycol, ethoxylated alkyl glucoside and ethoxylated bisphenol A reacted with one or more equivalents of an end-capping group such as isocyanatoethyl methacrylate, methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups. Additional examples of hydrogel monomers include, without limitation, hydrophilic vinyl carbonate or vinyl carbamate monomers as disclosed in U.S. Pat. No. 5,070,215 and the hydrophilic oxazolone monomers as disclosed in U.S. Pat. No. 4,910,277, both references incorporated herein in their entireties by reference.

The term "vinyl-type" or "vinyl-containing" monomers refer to monomers containing the vinyl grouping (—CH═CH$_2$) and are generally highly reactive. Such hydrophilic vinyl-containing monomers are known to polymerize relatively easily. "Acrylic-type" or "acrylic-containing" monomers are those monomers containing the acrylic group: (CH$_2$═CRCOX) wherein R is H or CH$_3$, and X is O or N and which are known to polymerize readily such as, without limitation, N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

The preferred hydrogel monomers used to make the silicone-containing hydrogel useful in the invention may be either acrylic- or vinylic-containing and the monomers themselves may be crosslinkers. Useful vinylic-containing monomers include, without limitation, N-vinyl lactams, such as N-vinyl pyrrolidone ("CNVP"), N-vinyl-N-methyl acetamide, N-vinyl-N-ethyl acetamide, N-vinyl-N-ethyl formamide, and N-vinyl formamide with N-vinyl pyrrolidone being preferred.

Particularly useful silicone-containing hydrogel monomers include those that contains at least two [—Si—O—] repeating units. Preferably, the total Si and attached O are present in the silicone-containing monomer in an amount greater than about 20 weight percent, and more preferably greater than about 30 weight percent of the total molecular weight of the silicone-containing monomer.

Preferred silicone-containing hydrogel monomers are of the following of Structure I:

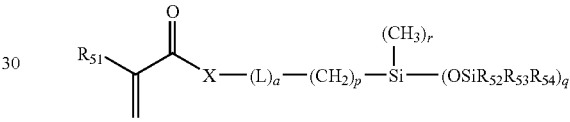

wherein $R_{51}$, is H or $CH_3$, q is 1, 2, or 3 and for each q, $R_{52}$, $R_{53}$ and $R_{54}$ are independently an alkyl or an aromatic, preferably ethyl, methyl, benzyl, phenyl, or a siloxane chain comprising from 1 to 100 repeating Si—O units, p is 1 to 10, r=(3−q), X is O or $NR_{55}$, where $R_{55}$ is H or a alkyl group with 1 to 4 carbons, a is 0 or 1, and L is a divalent linking group which preferably comprises from 2 to 5 carbons, which may also optionally comprise ether or hydroxyl groups, for example, a polyethylene glycol chain. Examples of such monomers include, without limitation, methacryloxypropyl-bis(trimethylsiloxy)methylsilane, methacryloxypropyltris(trimethylsiloxy)methylsilane, methacryloxypropylpentamethyldisiloxane, and (3-methacryloxy-2-hydroxypropyloxy)propylbis(trimethylsiloxy)methylsilane.

It is more preferred to use linear mono-alkyl terminated polydimethylsiloxanes ("mPDMS") such as those shown in the following Structure II:

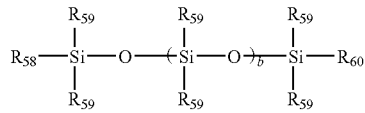

where b is a distribution having a most frequently occurring b value and that b value is 0 to 100, preferably 8 to 10; $R_{58}$ is a group containing a free radical polymerizable ethylenically unsaturated moiety, preferably methacrylate, methacrylamide, styryl, N-vinyl amide, N-vinyl lactams, vinyl carbonates, vinyl carbamates, maleate, or fumarate; each $R_{59}$ is independently an alkyl, or aryl group, which may be further substituted with alcohol, amine, ketone, carboxylic acid or ether groups, preferably unsubstituted alkyl or aryl groups, more preferably methyl; and $R_{60}$ is an alkyl, or aryl group, which may be further substituted with alcohol, amine, ketone, carboxylic acid or ether groups, preferably unsubstituted alkyl or aryl groups, preferably a $C_{1-10}$ aliphatic or aromatic group which may include hetero atoms, more preferably $C_{3-8}$ alkyl groups, most preferably butyl.

Additional silicone-containing hydrogel monomers may be combined with the silicone-containing hydrogel monomers of Stuctures I and II to form the articles produced by the method of the invention. Any known silicone-containing hydrogel monomer useful for making silicone-containing hydrogels can be used in combination with the silicone-containing hydrogel monomer of Structure I and II to form the articles of this invention. Many silicone-containing hydrogel monomers useful for this purpose are disclosed in U.S. Pat. No. 6,020,445 incorporated herein in its entirety by reference. Useful additional silicone-containing hydrogel monomers combined with the silicone-containing monomers of Structure I to form the silicone hydrogels of this invention are the hydroxyalkylamine-functional silicone-containing monomers disclosed in U.S. Pat. No. 5,962,548 incorporated herein in its entirety by reference. The preferred silicone-containing linear or branched hydroxyalkylamine-functional monomers comprising a block or random monomer of the following structure:

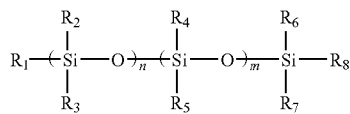

Structure III wherein:

where n and m each is a distribution having a most frequently occurring n and m value, respectively and that n value is 0 to 500 and that m value is 0 to 500 and (n+m)=10 to 500 and more preferably 20 to 250; $R_2$, $R_4$, $R_5$, $R_6$ and $R_7$ are independently a alkyl, or aryl group, which may be further substituted with alcohol, ester, amine, ketone, carboxylic acid or ether groups, preferably unsubstituted alkyl or aryl groups; and $R_1$, $R_3$ and $R_8$ are independently an alkyl, or aryl group, which may be further substituted with an alcohol, ester, amine, ketone, carboxylic acid or ether group, preferably unsubstituted alkyl or aryl groups, or are the following nitrogen-containing structure:

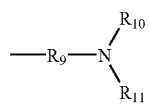

Structure IV with the proviso that at least one of $R_1$, $R_3$, and $R_8$ are according to Structure IV, wherein $R_9$ is a divalent alkyl group such as —$(CH_2)_s$— where s is from 1 to 10, preferably 3 to 6 and most preferably 3;

$R_{10}$ and $R_{11}$ are independently H, a alkyl or aryl group which may be further substituted with an alcohol, ester, amine, ketone, carboxylic acid or ether group, or has the following structure:

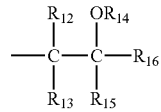

Structure V where $R_{14}$, is H, or a polymerizable group comprising acryloyl, methacryloyl, styryl, vinyl, allyl or N-vinyl lactam, preferably H or methacryloyl; $R_{16}$ is either H, a alkyl or aryl group which can be further substituted with alcohol, ester, amine, ketone, carboxylic acid or ether groups, or a polymerizable group comprising acrylate, methacrylate, styryl, vinyl, allyl or N-vinyl lactam, preferably alkyl substituted with an alcohol or methacrylate; $R_{12}$, $R_{13}$ and $R_{15}$ are independently H, an alkyl or aryl, which can be further substituted with alcohol, ester, amine, ketone, carboxylic acid or ether groups, or $R_{12}$ and $R_{15}$, or $R_{15}$ and $R_{13}$ can be bonded together to form a ring structure, with the proviso that at least some of the Structure IV groups on the monomer comprises polymerizable groups. $R_{12}$, $R_{13}$ and $R_{15}$ are preferably H.

In alternative embodiments, the silicone-containing hydrogel mixtures useful in this invention, composed of the silicone-containing hydrogel monomers of either or both Structure I and Structure II also may contain hydrophilic monomers. The hydrophilic monomers optionally used can be any of the known hydrophilic monomers useful in making hydrogels.

The preferred hydrophilic monomers used to make the silicone-containing hydrogel monomers of this invention may be either acrylic- or vinyl-containing. Such monomers may themselves be used as crosslinking agents. Hydrophilic vinyl-containing monomers that may be incorporated into the silicone-containing hydrogels of the present invention include monomers such as N-vinyl lactams (e.g. NVP), N-vinyl-N-methyl acetamide, N-vinyl-N-ethyl acetamide, N-vinyl-N-ethyl formamide, N-vinyl formamide, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. Nos. 5,070,215, and the hydrophilic oxazolone monomers disclosed in U.S. Pat. Nos. 4,910,277, both references incorporated herein in their entireties by reference. Other suitable hydrophilic monomers will be apparent to one skilled in the art.

More preferred hydrophilic monomers which may be incorporated into the polymer of the present invention include hydrophilic monomers such as N,N-dimethylacrylamide ("DMA"), 2-hydroxyethyl methacrylate ("HEMA"), glycerol methacrylate, 2-hydroxyethyl methacrylamide, NVP, polyethyleneglycol monomethacrylate, methacrylic acid and acrylic acid with DMA being the most preferred.

Other monomers that can be present in the reaction mixture used to form the hydrogel or silicone-containing hydrogel monomer mixtures useful in this invention include ultra-violet absorbing monomers, reactive tints, pigments, and the like. Additional processing aids such as release agents or wetting agents can also be added to the reaction mixture.

A polymerization initiator preferably is included with the hydrogel or silicone-containing hydrogel monomer mixture. An initiator also may be used in the coating composition, but is not preferred. The coating composition and monomer mixture initiators may be the same or different. The polymerization initiators used may be visible light, thermal, an ultraviolet initiators, or the like, or a combination thereof These initiators are well known in the art and commercially available. The initiator may be used in catalytically effective amounts which is an amount sufficient to initiate the polymerization reaction desired. Generally, about 0.1 to about 2 parts by weight per 100 parts of the hydrogel or silicone hydrogel will be used.

The monomer mixture is dispensed into the coated mold. The hydrogel or silicone-containing hydrogel monomer mixture may be dispensed into the mold or mold half by any convenient means including, without limitation, pipetting, dispensing via syringe, pumping via automated or manual pump, and the like and combinations thereof. In the next step of the invention, the hydrogel or silicone-containing hydrogel monomer mixture is cured, or polymerized to form a coated article. Dwell time, or the elapsed time from which the monomer mixture is dispensed into the mold until curing commences is critical because the coating composition is soluble in the hydrogel and silicone-containing hydrogel monomer mixtures. Dwell time must be less than about 5 minutes and preferably is less than about 45 secs.

The curing additionally is carried out under conditions suitable for curing the coated article to be formed. Suitable conditions will depend on a number of factors including, without limitation, the amount and type of the coating composition and monomer mixture used, the article to be formed, and the nature, i.e., visible light or heat, of the cure used. The determination of the precise conditions required are within the ability of one ordinarily skilled in the art.

Curing of the monomer mixture may be initiated using the appropriate choice of heat, visible or ultraviolet light, or other means and preferably is carried out in the presence of a polymerization initiator. For contact lens production, the preferred initiator is a 1:1 blend of 1-hydroxycyclohexyl phenyl ketone and bis(2, 6-dimethoxybenzoyl)-2, 4, 4-trimethylpentyl phosphine oxide and the preferred method of polymerization initiation is visible light. For some monomer reaction mixtures it is preferred to cure the reaction mixtures at temperatures slightly above room temperature, such as 25-90° C., so as to prevent phase separation of the components. In a particularly preferred embodiment for contact lens production, the reaction mixture is precured at about 45° C. followed by through-curing at about 70° C.

The resulting article will be coated with the coating composition coated onto the molding surface of the mold. After curing of the monomer mixture and coating composition, the resulting article may be treated with a solvent to remove any diluent used or any traces of unreacted components, and hydrate the polymer to form the hydrogel. For contact lenses, the solvent used may be water or an aqueous solution such as physiological saline.

Alternatively, and depending on the solubility characteristics of the diluent used to make the lens and the solubility characteristics of any residual unpolymerized monomers, the solvent initially used may be an organic liquid such as ethanol, methanol, isopropanol, mixtures thereof, or the like, or a mixture of one or more such organic liquids with water, followed by extraction with pure water (or physiological saline) to produce a hydrogel or silicone hydrogel lens swollen with water.

In a preferred embodiment, a silicone-containing hydrogel lens is made by dispensing into the mold or mold half, and subsequently curing, a macromer with a reaction mixture that include silicone-containing monomers and hydrophilic monomers. This technique affords a high level of control of the structure of the ultimate product.

The macromers may be, and preferably are, made by combining a/an (meth)acrylate and a silicone in the presence of a Group Transfer Polymerization ("GTP") catalyst. These macromers typically comprise copolymers of various monomers. They may be formed in such a way that the monomers come together in distinct blocks, or in a generally random distribution. These macromers may furthermore be linear, branched, or star shaped. Branched structures are formed for instance if polymethacrylates, or crosslinkable monomers such as 3-(trimethylsiloxy)propyl methacrylate are included in the macromer. Initiators, reaction conditions, monomers, and catalysts that can be used to make GTP polymers are known, as for example described in "Group-Transfer Polymerization" by O. W. Webster, in Encyclopedia of Polymer Science and Engineering Ed. (John Wiley & Sons) p. 580, 1987. These polymerizations are conducted under anhydrous conditions. Hydroxyl-functional monomers, like HEMA, can be incorporated as their trimethylsiloxy esters, with hydrolysis to form free hydroxyl group after polymerization. GTP offers the ability to assemble macromers with control over molecular weight distribution and monomer distribution on the chains. This macromer is then reacted with a reaction mixture comprising predominantly polydimethylsiloxane (preferably, mPDMS), and hydrophilic monomers.

Preferred macromer components include mPDMS, 3-methacryloxypropyltris(trimethylsiloxy)silane ("TRIS"), methyl methacrylate, HEMA, DMA, methacrylonitrile, ethyl methacrylate, butyl methacrylate, 2-hydroxypropyl-1-methacrylate, 2-hydroxyethyl methacrylamide and methacrylic acid. It is even more preferred that the macromer is made from a reaction mixture comprising HEMA, methyl methacrylate, TRIS, and mPDMS. It is most preferred that macromer is made from a reaction mixture comprising, consisting essentially of, or consisting of about 19.1 moles of the trimethylsilyl ether of HEMA, about 2.8 moles of methyl methacrylate, about 7.9 moles of TRIS, and about 3.3 moles of monomethacryloxypropyl terminated mono-butyl terminated polydimethylsiloxane, and is completed by reacting the aforementioned material with about 2.0 moles per mole of 3-isopropenyl-ω,ω-dimethylbenzyl isocyanate using dibutyltin dilaurate as a catalyst.

Silicone-containing hydrogels can be made by reacting blends of macromers, monomers, and other additives such as UV blockers, tints, internal wetting agents, and polymerization initiators. The reactive components of these blends typically comprise a combination of hydrophobic silicone with hydrophilic components. Because these components are often immiscible because of their differences in polarity, it is particularly advantageous to incorporate a combination of hydrophobic silicone monomers with hydrophilic monomers, especially those with hydroxyl groups, into the macromer. The macromer can then serve to compatibilize the additional silicone and hydrophilic monomers that are incorporated in the final reaction mixture. These blends typically also contain diluents to further compatibilize and solubilize all components. Preferably, the silicone based hydrogels are made by reacting the following monomer mix: macromer; an $Si_{8-10}$ monomethacryloxy terminated polydimethyl siloxane; and hydrophilic monomers together with minor amounts of additives and photoinitiators. It is more preferred that the hydrogels are made by reacting macromer; an $Si_{8-10}$ monomethacryloxy terminated polydimethyl siloxane; TRIS; DMA; HEMA; and tetraethyleneglycol dimethacrylate ("TEGDMA"). It is most preferred that the hydrogels are made from the reaction of (all amounts are calculated as weight percent of the total weight of the combination) macromer (about 18%); an $Si_{8-10}$ monomethacryloxy terminated polydimethyl siloxane (about 28%); TRIS (about 14%); DMA (about 26%); HEMA (about 5%); TEGDMA (about 1%), polyvinylpyrrolidone ("PVP") (about 5%); with the balance comprising minor amounts of additives and photoinitiators, and that the reaction is conducted in the presence of 20% wt dimethyl-3-octanol diluent.

The preferred range of the combined silicone-containing monomer of Structure I and additional silicone-containing monomers, if present in the reaction mixture, is at least about 5 to about 100 weight percent, more preferably at least about 10 and no more than about 90 weight percent, and most preferably at least about 15 and no more than about 80 weight percent of the reactive components in the reaction mixture. The preferred range of optional hydrophilic monomer if present in the above invention is at least about 5 and no more than about 80 weight percent, more preferably at least about 10 and no more than about 60 weight percent, and most preferably at least about 20 and no more than about 50 weight percent of the reactive components in the reaction mixture. The preferred range of diluent is from about 0 to no more than about 70 weight percent, more preferably about 0 to no more than about 50 weight percent, and most preferably about 0 to no more than about 20 weight percent of the total reaction mixture. The amount of diluent required varies depending on the nature and relative amounts of the reactive components.

In a preferred combination of reactive components at least about 10 and no more than about 60, more preferably at least about 15 and no more than about 50 weight percent of the reactive components is silicone-containing monomer, at least about 20 and no more than about 50 weight percent of the reactive components is silicone-containing monomer of Structure I, at least about 10 and no more than 50 percent of the reactive components is a hydrophilic monomer, more preferably DMA, at least about about 0.1 and no more than about 1.0 percent of the reactive components is a UV or preferably a visible light-active photoinitiator and about 0 to no more than about 20 weight percent of the total reaction mixture is a secondary or tertiary alcohol diluent, more preferably a tertiary alcohol.

Mold materials useful in the invention are those that are unreactive to the coating composition and monomer mixture used. Preferably mold materials are polyolefins, such as polypropylene, and cyclic polyoelfins, such as those available under the tradename TOPAS®.

The invention may be further clarified by a consideration of the following, non-limiting examples.

EXAMPLES

In the examples, the following abbreviations are used:

| | |
|---|---|
| Blue-HEMA | product of the base-promoted displacement of one chloride of Reactive Blue # 4 dye by hydroxyethyl methacrylate. |

-continued

| | |
|---|---|
| CGI 1850 | 1:1 (wt) blend of 1-hydroxycyclohexyl phenyl ketone and bis(2,6-dimethoxybenzoyl)-2,4,4-trimethylpentyl phosphine oxide |
| DMA | N,N-dimethylacrylamide |
| DOE-120 | polyethylene glycol 120 methyl glucose dioleate |
| EtOH | ethanol |
| HEMA | 2-hydroxyethyl methacrylate |
| IPA | isopropanol |
| mPDMS | monomethacryloxypropyl terminated polydimethylsiloxane |
| Norbloc | 2-(2'-hydroxy-5-methacrylyloxyethylphenyl)-2H-benzotriazole |
| PVP | poly(N-vinyl pyrrolidone) |
| TEGDMA | tetraethyleneglycol dimethacrylate |
| TBACB | tetrabutyl ammonium-m-chlorobenzoate |
| THF | tetrahydrofuran |
| TMI | 3-isopropenyl-α,α-dimethylbenzyl isocyanate |
| TRIS | 3-methacryloxypropyltris (trimethylsiloxy) silane |

Example 1

A predominantly poly-DMA ("pDMA") pre-polymer of DMA:HEMA of n=70: n=4 was made using Group Transfer Polymerization and functionalized with n =3 mole equivalents of TMI as follows. 40 g THF, tetrabutylammonium 3-chlorobenzoate (TBACB, 1M solution n THF, 0.31 mL, 0.00031 moles), 0.09 g bis(dimethylamino)-methylsilane, 0.7 g p-xylene and 20.23 g (0.1 moles) 2-trimethylsiloxyethyl methacrylate were charged to a dry, three-necked flask under nitrogen. 4.36 g (0.025 moles) Methyltrimethylsilyl dimethylketene acetal were added to the mixture while stirring. The reaction was allowed to reach an exothermal peak and then to cool to 24° C. The solution was diluted with 82 g THF and 173.5 g (1.75 moles) DMA was fed through a 100 mL syringe over a two hour period. The exothermal increase was controlled to below 55° C. by reducing the feed rate of DMA and cooling the flask with ice. Additional TBACB (1M solution in THF, 0.94 mL, 0.00094 moles) diluted with 9 mL of THF was fed slowly during the reaction. 160 g dry THF were added to the solution after the temperature was dropped back to 36° C. The reaction was quenched with a mixture of 3.6 g deionized water, 6.40 g methanol, and 0.06 g dichloroacetic acid at 24° C. after 4 ½ hours of total reaction time. The quenched solution was allowed to reflux at 65° C. for 5 hours and then solvents were distilled off while toluene was added until the vapor temperature reached 110.3° C. To the toluene solution was added a mixture of 15.1 g (0.08 moles) TMI and 0.98 g dibutyl tin dilaurate and the mixture refluxed at 115° C. for 3 hours. The resulting solution was allowed to cool and was then filtered through a membrane and the solvent evaporated off under vacuum at 30-45° C.

Two coating formulations were made by dissolving the pre-polymer into IPA at 25 weight percent based on the total weight of the solution, along with 0.1 weight percent of DOE-120 surfactant. The coatings each were applied to the molding surfaces of complementary mold halves of lens molds made of TOPAS® 5013. Application of the coating was by compression molding of approximately 3 μl of coating solution onto the molding surface with a silicone pad. For the front curve molding surface, the pad was brought into contact with the coating, dropped onto the molding surface, compressed for approximately 0.5 sec., held for 1 sec., and released over a period of approximately 2 sec. For the back curve molding surface, the pad was dropped onto the molding surface, compressed and released over a period of approximately 0.5 sec. The coating was dried at room temperature for 30 min. Mean dry coating thicknesses were estimated to vary between 1 and 2 μm based on thickness measurements on flat TOPAS surfaces using Atomic Force Microscopy ("AFM").

Lenses were cast using the molds by dispensing into the molds a silicone hydrogel lens material of the following formulation:

TABLE 1

|  | Weight Percent |
| --- | --- |
| Macromer | 18.95 |
| TRIS | 14.74 |
| DMA | 27.37 |
| MPDMS | 29.47 |
| NORBLOC | 2.11 |
| CGI 1850 | 1.05 |
| TEGDMA | 1.05 |
| HEMA | 5.26 |

100 parts of the above listed formulation were mixed with 20 parts of 3,7-dimethyl-3-octanol diluent.

Macromer Preparation

To a dry container housed in a dry box under nitrogen at ambient temperature was added 30.0 g (0.277 mol) of bis(dimethylamino)methylsilane, a solution of 13.75 ml of a 1M solution of TBACB (386.0 g TBACB in 1000 ml dry THF), 61.39 g (0.578 mol) of p-xylene, 154.28 g (1.541 mol) methyl methacrylate (1.4 equivalents relative to initiator), 1892.13 g (9.352 mol) 2-(trimethylsiloxy)ethyl methacrylate (8.5 equivalents relative to initiator) and 4399.78 g (61.01 mol) of THF. To a dry, three-necked, round-bottomed flask equipped with a thermocouple and condenser, all connected to a nitrogen source, was charged the above mixture prepared in the dry box.

The reaction mixture was cooled to 15° C. while stirring and purging with nitrogen. After the solution reaches 15° C., 191.75 g (1.100 mol) of 1-trimethylsiloxy-1-methoxy-2-methylpropene (1 equivalent) was injected into the reaction vessel. The reaction was allowed to exotherm to approximately 62° C. and then 30 ml of a 0.40 M solution of 154.4 g TBACB in 11 ml of dry THF was metered in throughout the remainder of the reaction. After the temperature of reaction reached 30° C. and the metering began, a solution of 467.56 g (2.311 mol) 2-(trimethylsiloxy)ethyl methacrylate (2.1 equivalents relative to the initiator), 3636.6. g (3.463 mol) n-butyl monomethacryloxypropyl-polydimethylsiloxane (3.2 equivalents relative to the initiator), 3673.84 g (8.689 mol) TRIS (7.9 equivalents relative to the initiator) and 20.0 g bis(dimethylamino)methylsilane was added.

The mixture was allowed to exotherm to approximately 38-42° C. and then allowed to cool to 30° C. At that time, a solution of 10.0 g (0.076 mol) bis(dimethylamino)methylsilane, 154.26 g (1.541 mol) methyl methacrylate (1.4 equivalents relative to the initiator) and 1892.13 g (9.352 mol) 2-trimethylsiloxy)ethyl methacrylate (8.5 equivalents relative to the initiator) was added and the mixture again allowed to exotherm to approximately 40° C. The reaction temperature dropped to approximately 30° C. and 2 gallons of THF were added to decrease the viscosity. A solution of 439.69 g water, 740.6 g methanol and 8.8 g (0.068 mol) dichloroacetic acid was added and the mixture refluxed for 4.5 hours to de-block the protecting groups on the HEMA. Volatiles were then removed and toluene added to aid in removal of the water until a vapor temperature of 110° C. was reached.

The reaction flask was maintained at approximately 110° C. and a solution of 443 g (2.201 mol) TMI and 5.7 g (0.010 mol) dibutyltin dilaurate were added. The mixture was reacted until the isocyanate peak was gone by IR. The toluene was evaporated under reduced pressure to yield an off-white, anhydrous, waxy reactive monomer. The macromer was placed into acetone at a weight basis of approximately 2:1 acetone to macromer. After 24 hrs, water was added to precipitate out the macromer and the macromer 30 was filtered and dried using a vacuum oven between 45 and 60° C. for 20-30 hrs.

The lens material was cured in the molds using visible light for approximately 30 min. at 45° C. after which the lenses were demolded, leached using 100% IPA, and exchanged into fresh borate-buffered saline solution. The time between dispensing the lens material into the molds and the initiation of the cure, or the dwell time, was less than 5 minutes in all cases.

Lens wettability was measured using dynamic contact angle as follows. Five samples of each lens type were prepared by cutting out a center strip approximately 5 mm in width and equilibrating the strip in borate-buffered saline solution for more than 30 min. Contact angles of the strips were determined using a Cahn DCA-315 micro-balance. Each sample was cycled×4 in borate-buffered saline and the cycles were averaged to obtain the advancing and receding contact angles for each lens. The contact angles of the 5 lenses were then averaged to obtain the mean contact angle for the set.

The advancing contact angles for the lenses from the coated molds were 65±4°. The advancing contact angle for the uncoated control was 99±8°. This demonstrates that the mold transfer coating dramatically improved the wettability of the silicone hydrogel lenses.

Examples 2 - 5

Random copolymers of DMA and HEMA (n=272 for DMA and n=23 for HEMA) were prepared using free-radical polymerization as follows. HEMA (300 mg, 2.31 mmole), DMA (29.7 g, 300 mmole), and 100 mg CGI 1850 were dissolved in 120 mL of 3-methyl-3-pentanol. The mixture was degassed thoroughly by evacuating for 10 to 15 min., followed by purging with nitrogen. The evacuating/purging was repeated 3 to 4 times and then the mixture was placed under a nitrogen environment and transferred to a crystallizing dish and covered with a watch glass. The mixture was exposed to visible light, Phillips TL20 W/03T bulbs, for a period of approximately 1 hr and then the polymerization was terminated by exposing the system to oxygen.

The resulting polymer was precipitated by diluting the mixture with hexanes. Further purification was carried out by dissolving the polymer in acetone and re-precipitating with hexanes. The acetone/hexanes sequence was repeated and the white polymer was washed thoroughly with hexanes and dried on a rotary evaporator with the product being cut into several small pieces prior to completion of drying. The yield was 27.0 g (90%) of a white, foam-like product.

A portion of the above product was derivatized as its methacrylate using the following procedure. A three-necked, 50 mL, round bottomed flask was heat dried under vacuum, placed under nitrogen and charged with 10 mL THF. Pyridine, 5 mL, was added to the flask, followed by 645 mg (7.5 mmole) methacrylic acid. The system was cooled to below 5° C. and 1.026 g (9 mmole) methanesulfonyl chloride was added to the solution in a drop-wise fashion over a period of 5 to 10 min. The mixture was stirred for an additional 10 min while allowing it to warm to room temperature.

A 250 mL, three-necked flask was charged with 9 g HBEMA/DMA copolymer and 9 mg phenothiazine. The system was purged with nitrogen and 50 mL of THF was added to dissolve the compounds. The mixed anhydride solution was added to the flask via a syringe and the reaction mixture was stirred overnight at ambient temperature.

The solution was filtered through a sintered glass funnel into 200 mL of stirred hexanes. The solvents were decanted and the product was purified by dissolving it in isopropyl acetate, followed by the addition of hexanes. The polymer was washed with 2×50 mL of hexanes and dried in a rotary evaporator. Further purification was required due to the high methacrylic acid content. The product was dissolved in acetone, followed by precipitation using hexanes.

A coating formulation of 20 wt percent pDMA/HEMA and 0.1 wt percent DOE-120 in IPA was applied to TOPAS 5013 molds as in Example 1. Dry coating thickness was greater than 1 µm as measured by AFM. Both the native polymer and functionalized (with methacrylate) were examined as coatings. Lenses were made using the silicone hydrogel lens material of Example 1, except that the dwell time was as set forth on Table 2 below. Additionally on Table 2 is shown the wettability for the coatings.

TABLE 2

| Example | Methacrylate Capping | Dwell Time | Advancing Contact Angle (°) |
|---|---|---|---|
| 2 | Yes | 12 min. | 87 |
| 3 | Yes | 2.5 min. | 58 |
| 4 | Yes | 45 sec. | 62 |
| 5 | No | 45 sec. | 82 |

The results demonstrate that acceptable wettability, or an advancing contact angle less than 90°, can be obtained with or without the methacrylate group. Further, the results show that contact angle is dependent on dwell time, times of less than 2.5 min. producing the most wettable lens.

Examples 6-9

Poly-HEMA coatings were evaluated for efficacy and wettability. The coatings were prepared by exposing a solution of HEMA, Blue HEMA, and IRGACURE 1850 in ethylene glycol to low intensity visible light, Phillips TL20 W/03T bulbs, using curing times ranging from 1 to 2 hours. The polymers were isolated after aqueous work-ups followed by several aqueous washes to remove unreacted components. Polymer molecular weights of less than about 300 kD were found to be inadequate for use as a coating polymer with the lens material of Example 1. A poly-HEMA of 360 kD MW, available from Aldrich Chemical Company, was successfully used as a coating. Coating formulations with differing concentrations of poly-HEMA were prepared as follows:
Poly-HEMA:water:ethanol:DOE-120=10:20:70:0.1 w/w
Poly-HEMA:water:ethanol:DOE-120=15:20:65:0.1 w/w
Poly-HEMA:water:ethanol:DOE-120=20:20:60:0.1 w/w The coatings were applied to the molding surfaces of TOPAS 5013 molds according to the procedure of Example 1, except that prior to coating, the molds were treated for <0.5 sec. with an air plasma to improve spreading of the coating solution onto the mold. Lenses were made using procedures and the silicone hydrogel lens material of Example 1, except that dwell time was 45 sec.

The resulting coated lenses were tested for wettability using dynamic contact angle and for surface roughness using AFM. AFM images were acquired with contact mode AFM using a 0.06 N/m SiN$_4$ cantilever imaging in borate-buffered saline solution. Imaging was minimized before data was acquired and typically was <10 nN. Images were of 20×20 µm, within the optical zone and on the anterior surface of each lens. Two lenses were evaluated for a total of 6 images. Mean peak-to-peak roughness values were calculated using 24 10×10 µm areas from these images. Peak-to-peak roughness was defined as the difference in height between the lowest and the highest point in the area tested. On Table 3 is shown the results.

TABLE 3

| Example | Poly-HEMA in Coating (%) | Advancing Contact Angle (°) | Mean Peak-to-Peak Roughness (nm) |
|---|---|---|---|
| 6 | 0 | 107 | <100 |
| 7 | 10 | 65 | 1425 |
| 8 | 15 | 46 | 3276 |
| 9 | 20 | 48 | N/A |

The results demonstrate that wettability improved with increasing levels of poly-HEMA in the coating solution. Additionally, surface roughness increased with increasing poly-HEMA content with the 20 wt percent poly-HEMA lens being too rough and misshapen to analyze. The 10 wt percent poly-HEMA coating produced a dry coating thickness on the mold of approximately 200 nm. Target peak-to-peak roughness for a useful lens is <500 nm and, thus, the dry coating thickness must be substantially less than 200 nm to achieve an acceptable surface roughness while maintaining desired wettability.

Examples 10-13

The silicone hydrogel lens material of Example 1 produced lenses with a water content of approximately 31 percent. Another similar lens formulation, with a water content of 39%, is as follows:

TABLE 4

| | Weight Percent |
|---|---|
| MACROMER | 18 |
| TRIS | 14 |
| DMA | 26 |
| MPDMS | 28 |
| TEGDMA | 1 |
| HEMA | 5 |
| PVP | 5 |
| Norblock | 2 |
| CGI 1850 | 1 |

The remainder of the formulation was additives and diluents. The monomer to diluent ratio was 100:20, the diluent being 3,7-dimethyl-3-octanol. The lenses of this material were coated with the 300 kD poly-HEMA coating, but resulting wettability and surface roughness were unacceptable.

A higher Mw poly-HEMA, containing greater than 1.6 wt percent of Blue HEMA was synthesized using visible light initiated by CGI 1850 and the resultant polymer had a Mw of >1,000,000. A mixture of 900 mg blue HEMA, 44.1 g HEMA, 615 mg CGI 1850 and 150 mL ethylene glycol was stirred until homogeneous and the system was degassed as described in Examples 2-5. The mixture was transferred to a large crystallizing dish and covered with a watch glass. Polymerization of the olefinic moieties was conducted under visible light for approximately 1 hour. Upon quenching of the polymerization using oxygen, the mixture was poured into 500 mL borate-buffered saline solution and stirred for several hours until the material was transformed into a more rigid form. The liquids were decanted and the product washed with another 500 mL borate-buffered saline solution. The polymer was cut into several smaller pieces and stirred in 500 mL deionized water for more than 1 hour to the point that the product becomes gel-like and was sparingly soluble in the solvent. The mixture was then diluted with a small quantity of borate-buffered saline solution to enable better precipitation of the polymer. The mixture was filtered and washed in deionized water until the material did not appear soluble. The suspension was filtered, dried in a rotary evaporator, cut into smaller pieces and further dried until it appeared crystalline and anhydrous. The dark blue polymer was then milled into fine particles and subjected to more deionized water washings accompanied by 1 to 2 hours of stirring with each wash. Washing continued until little or no blue color was visible in solution and the product was filtered, dried at reduced pressure, and ground in a blender. The Mw of this coating polymer was measured to be 1.2 million g/mol using GPC and a 2% solution of the polymer in a 1:1 ethanol:ethyl lactate solvent had a viscosity of 17.7 cP at 25° C. at a shear rate of 40/s.

This coating was used to coat TOPAS 5013 molds via spin coating according to the following procedure. Solutions of the polymer from 0.5 to 2 wt percent by steps if 0.5 wt percent were dissolved in a mixed solvent system of 1 part ETOH and 1 part ethyl lactate. The coating was applied to the 20 molding surface of the mold by dispensing the solution onto the center of a part spinning at approximately 6000 rpm and allowing the part to spin for 5 sec. before stopping. Lenses were made with these coated molds using the above-described lens material and a dwell time of 30 sec. On Table 5 is shown the wettability and surface roughness of the resulting lenses.

TABLE 5

| Example | Poly-HEMA in Coating (%) | Advancing Contact Angle (°) | Dry Film Thickness (nm)* | Mean Peak-to-Peak Roughness (nm) |
|---|---|---|---|---|
| 10 | 0.5 | 100 | 21 | 113 |
| 11 | 1.0 | 81 | 67 | 401 |
| 12 | 1.5 | 72 | 78 | 790 |
| 13 | 2.0 | 78 | 125 | 1170 |

*Measured with AFM on TOPAS flats.

The results show that changing the dry film thickness can simultaneously achieve acceptable wettability and surface roughness.

Example 14

High Mw blue poly-HEMA coated silicone hydrogel lenses with the formulation listed on Table 6 were formed.

TABLE 6

| | Weight Percent |
|---|---|
| Macromer | 17.98 |
| TRIS | 14.00 |
| DMA | 26.00 |
| MPDMS | 28.00 |
| TEGDMA | 1.00 |
| HEMA | 5.00 |
| PVP | 5.00 |
| NORBLOC | 2.00 |
| Blue HEMA | 0.02 |
| CGI 1850 | 1.00 |

The remainder of the formulation were additives and diluents. The monomer to diluent ratio was 100:20, the diluent being 3,7-dimethyl-3-octanol. Acetic acid, 1% of the final mix, was used to stabilize the monomer.

TOPAS 5013 front and back curve molds were coated with a 1.25 wt percent solution of blue-poly-HEMA and lens made as described in Examples 10-13. Excess coating accumulated near the edge of the front surface mold was removed using a cloth swab during the spinning process.

The lenses were tested for wettability and surface roughness prior to clinical evaluation. Mean peak-to-peak front surface roughness was 291 nm and mean advancing contact angle was 83°. Five lenses of −0.50 diopter power were fit in a contra-lateral study for a 30 min. wear schedule. The lens surface was equivalent in on-eye wettability, or tear break-up time, and deposition resistance to ACUVUE® etafilcon A lenses demonstrating that application of the coating to the lens results in a physiological compatible lens.

What is claimed is:

1. A method for manufacturing an article comprising the steps of: a.) coating a molding surface of a mold or a mold half with a coating effective amount of a high molecular weight coating composition having a molecular weight of greater than about 300 kD and comprising at least one polymer selected from the group consisting of poly(vinyl alcohol), polyethylene oxide, poly(2-hydroxyethyl methacrylate), poly(acrylic acid), poly(methacrylic acid), poly(maleic acid), poly(itaconic acid), poly(acrylamide), poly(dimethylacrylamide), carboxymethylated polymers, polystyrene sulfonic acid, polysulfonate polymers, polysaccharides, glucose amino glycans, block or random copolymers thereof, or mixtures thereof; b.) dispensing a monomer mixture comprising, a silicone-containing hydrogel monomer, into the mold or mold half; and c.) curing the monomer mixture and the coating composition using a dwell time of less than about 45 seconds and under conditions suitable to form an article coated with the coating composition;
wherein said at least one polymer does not chemically attach to the article.

2. The method of claim 1, wherein the article is a contact lens.

3. The method of claim 1 or 2, wherein the monomer mixture further comprises at least one hydrogel monomer.

4. The method of claim 1, wherein the coating composition further comprises a low boiling point solvent and a high boiling point solvent.

5. The method of claim 4, wherein the coating of the molding surface is carried out by spin coating.

6. The method of claim 5, wherein spin coating is carried out using at least about 2 μl and no more than about 20 μl of the coating composition.

7. The method of claim 6, further comprising applying, subsequent to the spin coating step, a pressurized air jet to an edge of the mold.

8. The method of claim 1 wherein the coating composition has a viscosity of about 17.7 cP at 25° C.

9. The method of claim 1 wherein the coating composition has a viscosity of at least about 4 cP at 25° C.

10. The method of claim 1 wherein the coating composition has a viscosity of greater than about 1 cP at 25° C.

11. The method of claim 4 wherein the low boiling point solvent comprises ethanol and the high boiling point solvent comprises ethyl lactate.

12. The method of claim 4 wherein the low boiling point solvent has a boiling point of less than about 90° C.

13. The method of claim 4 wherein the low boiling point solvent comprises ethanol.

14. The method of claim 4 wherein the low boiling point solvent is selected from the group consisting of n-methyl pyrrolidone, acetone, chloroform, methanol, ethanol, isopropanol, tert-butanol and combinations thereof.

15. The method of claim 4 wherein the high boiling point has a boiling point of greater than about 100° C.

16. The method of claim 4 wherein the high boiling point solvent comprises ethyl lactate.

17. The method of claim 4 wherein the high boiling point solvent is selected from the group consisting of methyl lactate, ethyl lactate, isopropyl lactate, ethylene glycol, polyethylene glycol, propylene glycol, dimethyl formamide, tetrahydrogeraniol, 1-butanol, 1-pentanol, 1-hexanol, 1-octanol, 3-methyl-3-pentanol, dimethyl-3-octanol, 3-methoxy-1-butanol, 1,2-butanediol, 1,4-butanediol, 1,3-hexanediol, water and combinations thereof.

18. The method of claim 4 wherein the low boiling point solvent and the high boiling point solvent are present at a ratio of about 1:1.

19. The method of claim 11 wherein the low boiling point solvent and the high boiling point solvent are present at a ratio of about 1:1.

20. A method for manufacturing an article comprising: a.) coating a molding surface of a mold or a mold half with a coating effective amount of a high molecular weight hydrophilic coating composition having a molecular weight of greater than about 300 kD and comprising poly(2-hydroxyethyl methacrylate).; b.) dispensing a monomer mixture comprising a hydrogel monomer, silicone-containing hydrogel monomer, or combination thereof into the mold or mold half; and c.) curing the monomer mixture and coating composition using a dwell time of less than about 45 seconds and under conditions suitable to form an article coated with the coating composition wherein said coating composition does not chemically attach to the article.

21. The method of claim 20, wherein the article is a contact lens.

22. The method of claim 21, wherein the monomer mixture comprises a hydrogel monomer.

23. The method of claim 21, wherein the monomer mixture comprises a silicone hydrogel monomer.

24. The method of claim 23, wherein the silicone hydrogel monomer mixture comprises a reaction product of a silicone based macromer Group Transfer Polymerization product and a polymerizable mixture comprising $Si_{8-10}$ monomethacryloxy terminated polydimethyl siloxane, polydimethylsiloxane other than $Si_{8-10}$ monomethacryloxy terminated polydimethyl siloxane, and a hydrophilic monomer.

25. The method of claim 24, wherein the silicone hydrogel monomer mixture comprises the macromer in an amount of about 15 to about 25 wt percent, the $Si_{8-10}$ monomethacryloxy terminated polydimethyl siloxane in an amount of about 20 to about 30 wt percent; methacryloxypropyl tris(trimethyl siloxy) silane in an amount of about 15 to about 25 wt percent; N,N-dimethyl acrylamide in an amount of about 20 to about 30 wt percent; 2-hydroxy ethyl methacrylate in an amount of about 2 to about 7 wt percent; tetraethyleneglycol dimethacrylate in an amount of about 0 to about 5 wt percent and poly(N-vinyl pyrrolidinone) in an amount of about 0 to about 5 weight percent.

26. The method of claim 21, wherein the coating composition further comprises a low boiling point solvent and a high boiling point solvent.

27. The method of claim 26, wherein the coating of the molding surface is carried out by spin coating.

28. The method of claim 27, wherein spin coating is carried out using at least about 2 µl and no more than about 20 µl of the coating composition.

29. The method of claim 28, further comprising applying, subsequent to the spin coating step, a pressurized air jet to an edge of the mold.

30. The method of claim 20 wherein the coating composition has a viscosity of about 17.7 cP at 25° C.

31. The method of claim 20 wherein the coating composition has a viscosity of at least about 4 cP at 25° C.

32. The method of claim 20 wherein the coating composition has a viscosity of greater than about 1 cP at 25° C.

33. The method of claim 26 wherein the low boiling point solvent comprises ethanol and the high boiling point solvent comprises ethyl lactate.

34. The method of claim 26 wherein the low boiling point solvent has a boiling point of less than about 90° C.

35. The method of claim 26 wherein the low boiling point solvent comprises ethanol.

36. The method of claim 26 wherein the low boiling point solvent is selected from the group consisting of n-methyl pyrrolidone, acetone, chloroform, methanol, ethanol, isopropanol, tert-butanol and combinations thereof.

37. The method of claim 26 wherein the high boiling point has a boiling point of greater than about 100° C.

38. The method of claim 26 wherein the high boiling point solvent comprises ethyl lactate.

39. The method of claim 26 wherein the high boiling point solvent is selected from the group consisting of methyl lactate, ethyl lactate, isopropyl lactate, ethylene glycol, polyethylene glycol, propylene glycol, dimethyl formamide, tetrahydrogeraniol, 1-butanol, 1-pentaol, 1-hexanol, 1-octanol, 3-methyl-3-pentanol, dimethyl-3-octanol, 3-methoxy-1-butanol, 1,2-butanediol, 1,4-butanediol, 1,3-hexanediol, water and combinations thereof.

40. The method of claim 26 wherein the low boiling point solvent and the high boiling point solvent are present at a ratio of about 1:1.

41. The method of claim 33 wherein the low boiling point solvent and the high boiling point solvent are present at a ratio of about 1:1.

42. A method for manufacturing contact lenses comprising: a.) coating a molding surface of a mold or a mold half with a coating effective amount of a hydrophilic coating composition having a molecular weight of greater than about 300 kD; b.) dispensing a mixture comprising a silicone-containing hydrogel monomer into the mold or mold half; and c.) curing the mixture and coating composition using a dwell time of less than about 45 seconds and under conditions suitable to form a contact lens coated with the coating composition, wherein the formed lens exhibits physiological compatibility and said coating composition does not chemically attach to the article.

43. The method of claim 42, wherein the mixture further comprises at least one hydrogel monomer.

44. The method of claim 42, wherein the silicone hydrogel monomer mixture comprises a reaction product of a silicone based macromer Group Transfer Polymerization product and a polymerizable mixture comprising $Si_{8-10}$ monomethacryloxy terminated polydimethyl siloxane, polydimethylsiloxane other than $Si_{8-10}$ monomethacryloxy terminated polydimethyl siloxane, and a hydrophilic monomer.

45. The method of claim 44, wherein the silicone hydrogel monomer mixture comprises the macromer an amount of about 15 to about 25 wt percent, the $Si_{8-10}$ monomethacryloxy terminated polydimethyl siloxane in an amount of about 20 to about 30 wt percent; methacryloxypropyl tris(trimethyl siloxy)silane in an amount of about 15 to about 25 wt percent; N,N-dimethyl acrylamide in an amount of about 20 to about 30 wt percent; 2-hydroxy ethyl methacrylate in an amount of about 2 to about 7 wt percent; tetraethyleneglycol dimethacrylate in an amount of about 0 to about 5 wt percent and poly(N-vinyl pyrrolidinone) in an amount of about 0 to about 5 weight percent.

46. The method of claim 42, 43, 44, or 45, wherein the coating composition comprises poly(vinyl alcohol), polyethylene oxide, poly(2-hydroxyethyl methacrylate), poly(acrylic acid), poly(methacrylic acid), poly(maleic acid), poly(itaconic acid), poly(acrylamide), poly(dimethacrylamide), carboxymethylated polymers, polystyrene sulfonic acid, polysulfonate polymers, polysaccharides, glucose amino glycans, block or random copolymers thereof, or mixtures thereof.

47. The method of claim 46, wherein the coating composition comprises poly(2-hydroxyethyl methacrylate).

48. The method of claim 46, wherein the coating composition further comprises a low boiling point solvent and a high boiling point solvent.

49. The method of claim 48, wherein the coating of the molding surface is carried out by spin coating.

50. The method of claim 49, wherein spin coating is carried out using at least about 2 µl and no more than about 20 µl of the coating composition.

51. The method of claim 50, further comprising applying, subsequent to the spin coating step, a pressurized air jet to an edge of the mold.

52. The method of claim 42 wherein the coating composition has a viscosity of about 17.7 cP at 25° C.

53. The method of claim 42 wherein the coating composition has a viscosity of at least about 4 cP at 25° C.

54. The method of claim 42 wherein the coating composition has a viscosity of greater than about 1 cP at 25° C.

55. The method of claim 48 wherein the low boiling point solvent comprises ethanol and the high boiling point solvent comprises ethyl lactate.

56. The method of claim 48 wherein the low boiling point solvent has a boiling point of less than about 90° C.

57. The method of claim 48 wherein the low boiling point solvent comprises ethanol.

58. The method of claim 48 wherein the low boiling point solvent is selected from the group consisting of n-methyl pyrrolidone, acetone, chloroform, methanol, ethanol, isopropanol, tert-butanol and combinations thereof.

59. The method of claim 48 wherein the high boiling point has a boiling point of greater than about 100° C.

60. The method of claim 48 wherein the high boiling point solvent comprises ethyl lactate.

61. The method of claim 48 wherein the high boiling point solvent is selected from the group consisting of methyl lactate, ethyl lactate, isopropyl lactate, ethylene glycol, polyethylene glycol, propylene glycol, dimethyl formamide, tetrahydrogeraniol, 1-butanol, 1-pentanol, 1-hexanol, 1-octanol, 3-methyl-3-pentanol, dimethyl-3-octanol, 3-methoxy-1-butanol, 1,2-butanediol, 1,4-butanediol, 1,3-hexanediol, water and combinations thereof.

62. The method of claim 48 wherein the low boiling point solvent and the high boiling point solvent are present at a ratio of about 1:1.

63. The method of claim 55 wherein the low boiling point solvent and the high boiling point solvent are present at a ratio of about 1:1.

* * * * *